United States Patent [19]
Ishiguro et al.

[11] Patent Number: 5,872,964
[45] Date of Patent: Feb. 16, 1999

[54] COMPARISON OPERATING UNIT AND GRAPHIC OPERATING SYSTEM

[75] Inventors: Masao Ishiguro, Yokohama; Keiji Kojima, Sagamihara; Kiyokazu Nishioka, Odawara; Tohru Nojiri, Tokyo; Kazuhiko Tanaka, Fujisawa; Yoshifumi Fujikawa, Yokohama, all of Japan

[73] Assignee: Hitachi, Ltd., Tokyo, Japan

[21] Appl. No.: 693,896

[22] Filed: Aug. 5, 1996

[30] Foreign Application Priority Data

Aug. 9, 1995 [JP] Japan ................................ 7-203256

[51] Int. Cl.⁶ ...................................... G06F 9/38
[52] U.S. Cl. ............................ 395/581; 345/506
[58] Field of Search ..................... 395/506, 581; 345/506

[56] References Cited

U.S. PATENT DOCUMENTS

| | | | |
|---|---|---|---|
| 5,345,541 | 9/1994 | Kelley et al. | 395/126 |
| 5,371,862 | 12/1994 | Suzuki et al. | 395/581 |
| 5,493,687 | 2/1996 | Garg et al. | 395/800.23 |
| 5,560,035 | 9/1996 | Garg et al. | 395/800.23 |

FOREIGN PATENT DOCUMENTS 2-144626  6/1990  Japan .

*Primary Examiner*—Parshotam S. Lall
*Assistant Examiner*—Kenneth R. Coulter
*Attorney, Agent, or Firm*—Fay, Sharpe, Beall, Fagan, Minnich & McKee

[57] ABSTRACT

A unit for efficiently carrying out a comparison operation and making it possible to prevent a generation of a disturbance in a pipeline during a pipeline operation is provided. This unit includes a first storage unit for storing storage information on two data to be compared, kind of comparison operation and result of comparison operation respectively, a second storage unit for storing said two data, kind of comparison operation and result of comparison operation, an operating unit for carrying out a predetermined plurality of kinds of comparison operations for two data, a selecting unit for selecting any one of results of comparison operation, and a processing unit for carrying out a processing of a comparison operation. The processing unit checks a storage destination of two data to be compared, gives the two data to the operating unit, checks a storage destination of a kind of a comparison operation, controls the selecting unit to select a result of an operation corresponding to the kind of comparison operation, and stores the operation result into a storage destination in the second storage unit.

9 Claims, 14 Drawing Sheets

FIG.5

```
          START
            ↓
  ┌──────────────────────────────┐
  │ A ← ALPHA VALUE, Z VALUE,    │
  │     STENCIL BUFFER VALUE      │──── 51
  │ B ← REFERENCE VALUE           │
  │ CF ← COMPARISON CONDITION     │
  └──────────────────────────────┘
            ↓
       ╱ A(CF)B ╲ ←──── COMPARISON CONDITION
  62 ─╱           ╲
  YES↓             ↓NO
 ┌─────────┐   ┌─────────┐
63│PROCESS α│   │PROCESS β│64
 └─────────┘   └─────────┘
      ↓             ↓
    END           END
```

FIG.6

| | NUMBER OF TOTAL INSTRUCTIONS | NUMBER OF EXECUTION INSTRUCTIONS | NUMBER OF CONDITIONAL BRANCH INSTRUCTIONS TO BE EXECUTED |
|---|---|---|---|
| PRESENT INVENTION | n+1 | 1 | 0 |
| CONVENTIONAL METHOD | 7n+27 | n+4 OR MORE | 1~7 | n=NUMBER OF INSTRUCTIONS FOR PROCESSING AFTER THE COMPARISON PROCESSING

FIG.7

| | NUMBER OF EXECUTION INSTRUCTIONS |
|---|---|
| IN THE CASE OF PARTITION INSTRUCTION | 2n+3 |
| IN THE CASE OF OTHER THAN PARTITION INSTRUCTION | 3n+1 | n=NUMBER OF PIXELS FOR ALPHA TEST

COMPARISON OPERATING UNIT AND GRAPHIC OPERATING SYSTEM

BACKGROUND OF THE INVENTION

1. Field of the Invention

The present invention relates to a unit for carrying out a comparison operation at a high speed, and relates more particularly to a comparison operating unit which is suitable for being stored in a microprocessor or the like for carrying out various kinds of graphic processing.

2. Description of the Related Art

When a so-called pipeline processing is to be carried out, instructions are processed separately at individual stages in the pipeline because the instructions are given continuously. Therefore, when branch instructions are executed and branch conditions are met, it becomes necessary to once abandon all the instructions in the pipeline and fetch the instructions again when the instructions are to be executed. Thus, when there exist a large number of branch instructions, the operation efficiency of the pipeline processing has been reduced.

In order to eliminate the above-described problem, according to the description of the Japanese Utility Model Registration Unexamined Publication No. JP-A-2-144626, each time when a conditional branch instruction is given, an address in which the branch instruction exists, a branch destination address and a branch instruction length are once stored in a table. Then, in the case of executing the branch instruction, when the stored branch instruction has been pre-fetched again, an address of the succeeding instruction and a predicted branch destination address are set in a register, and the instruction which exists in a branch destination is selectively fetched based on a result of branching, to thereby restrict an occurrence of a disturbance in the pipeline processing.

According to the above-described prior art technique, however, when a conditional branch instruction has been given, it is not possible to fetch the instruction in the branch destination until the branch result has been calculated, with a result that an idle time of processing is generated in the pipeline processing. For example, in processing for frequently executing comparison instructions, an increase in the time required for the processing due to the idle time has been a serious problem.

As an example of the above case, in the technology of three-dimensional computer graphics, there exists a depth buffer test, a stencil test, an alpha test, etc. for determining whether pixels are drawn in a picture within a polygon or not. In order to carry out these tests, a comparison operation of two data is executed based on comparison conditions assigned by the programmer. The same processing is to be executed regardless of the comparison conditions, that is, regardless of whether the comparison conditions are met or not. The details of the graphics processing are described in "OpenGL Programming Guide (Japanese version)", pp. 301–308 (Addison-Wesley, issued by Seiunsha), for example.

When comparison conditions can be optionally determined by a predetermined number and the processing to be executed does not depend on the comparison conditions as described above, it becomes necessary to carry out a processing for obtaining a result of the comparison operation by branching the processing by the number of the comparison conditions. Thus, when the processing is to be carried out by using the prior-art technique, the total idle processing time of the pipeline processing becomes longer along with the increase in the number of the branch instructions.

In conclusion, there is a limit to the improvement in the processing efficiency so long as the branch instructions are being executed. Further, even if the processing after the branching remains unchanged, it is necessary to describe the same execution contents at individual branch destinations at the time of coding a program. This has resulted in a problem that the program becomes huge and this leads to an increase in the memory consumption volume.

SUMMARY OF THE INVENTION

In order to solve the above-described problems, it is therefore an object of the present invention to provide a unit for efficiently executing a comparison operation by preventing an occurrence of a disturbance in the pipeline processing and a generation of idle time.

A unit which achieves the above-described object by eliminating the above-described problems, as follows.

This unit includes a first storage unit for storing at least information which shows individual storage destinations of two data that are to be compared, a kind of a comparison operation and a result of a comparison operation respectively, a second storage unit for storing at least the two data that are to be compared, the kind of a comparison operation and a result of the comparison operation, an operating unit for carrying out a predetermined plurality of kinds of comparison operation for the two data given, a selecting unit for selecting one of results of the comparison operation that has been carried out by the operating unit, and a processing unit for carrying out a processing for carrying out a comparison operation.

The processing unit is a comparison operating unit which checks the storage destination of the two data to be compared by referring to the storage contents of the first storage unit, provides the two data obtained from the storage destination in the second storage unit to the operating unit, checks the storage destination of the kind of the comparison operation, controls the selecting unit so as to select a processing result corresponding to the kind of the comparison operation obtained from the storage destination in the second storage unit, and stores the processing result selected by the selecting unit in a storage destination in the second storage unit corresponding to the storage destination of the comparison result stored in the first storage unit.

The above-described unit may also be modified as follows.

That is, the second storage unit is structured to have a first exclusive register for storing at least two data that are to be compared, a second exclusive register for storing at least a kind of the comparison operation, and a third exclusive register for storing a result of the comparison operation. Further, the processing unit is a comparison operating unit which checks the storage destination of the two data to be compared by referring to the storage contents of the first storage unit, providing the two data obtained from the storage destination in the first exclusive register to the operating unit, checks the storage destination of the kind of the comparison operation, controls the selecting unit to select a processing result corresponding to the kind of the comparison operation obtained from the storage destination in the second exclusive register, and stores the processing result selected by the selecting unit in one of the third exclusive register corresponding to the storage destination of the comparison result stored in the first storage unit, a predetermined storage destination of the first exclusive register and a predetermined storage destination of the second exclusive register.

Alternatively, it is also desirable to provide a comparison operating unit which has an execution control unit for controlling the operating unit that controls the driving of the operating unit by referring to the data stored in a predetermined storage position of the third exclusive register.

The first storage unit stores information for showing individual storage destinations of two data that are to be compared, a kind of a comparison operation and a result of a comparison operation respectively, and the second storage unit stores the two data that are to be compared, the kind of a comparison operation and a result of the comparison operation.

The operating unit carries out a comparison operation of a predetermined plurality of kinds of comparison operation for the two data given, and the selecting unit selects one of the results of the comparison operation carried out by the operating unit.

The processing unit carries out a comparison operation.

The processing unit checks the storage destination of the two data to be compared by referring to the storage contents of the first storage unit, provides the two data obtained from the storage destination in the second storage unit to the operating unit, checks the storage destination of the kind of the comparison operation and controls the selecting unit to select a processing result corresponding to the kind of the comparison operation obtained from the storage destination in the second storage unit.

Then, the processing unit stores the processing result selected by the selecting unit in a storage destination in the second storage unit corresponding to the storage destination of the comparison result stored in the first storage unit.

When it is so structured that a comparison operation for a plurality of sets of two data can be executed in one time, the comparison operation can be executed for each set of data, with a resultant improvement in the processing efficiency.

According to the present invention, it becomes possible to omit a processing for checking and understanding the kind of a branch instruction. Accordingly, it is also possible to prevent a generation of idle time in the pipeline processing attributable to a branch instruction. As a result, an improved processing efficiency can be expected.

The comparison operation method according to the present invention is compared with the conventional processing method, as an example. When the number of instructions of processing after the comparison operation is n=5, the total number of instructions is reduced from the conventional "62" to "6" according to the present invention. If the comparison operation is carried out efficiently, the size of a program for carrying out the comparison operation can also be reduced to about one tenth. Even if n is a very large number, the size of the program can be reduced to about one seventh.

Further, when it is assumed that all the instructions are executed in one cycle and only the conditional branch instructions stall by one cycle, it takes only one-cycle processing time to execute the processing excluding the post-comparison operation, as compared with five-cycle processing time that has been required in the best case according to the prior-art technique.

When a comparison operation instruction of a partition instruction can be executed, the number of instructions to be executed for processing an alpha test becomes smaller when the number of pixels to be processed is 3 or above, with a result of an improved processing efficiency. In general, the number of pixels drawn in a picture on the screen ranges from several hundreds to some ten thousands at most, and the partition instruction is effective for a graphic processing and the like.

Further, according to the present invention, it is possible to eliminate the processing for determining the kind of a branch processing which has been essential for the processing that meets the conditions that the two data to be processed are unchanged and that only the comparison conditions can be changed optionally. By the reduction in the number of execution instructions and by the prevention of a generation of idle time of the pipeline processing, the processing efficiency of the comparison operation can be improved substantially.

Further, when a mask register and a predicate register are installed, an execution or non-execution of an instruction can be set by a value stored in the register, which further improves the processing efficiency. When it becomes necessary to have the units relating to the present invention built into a microprocessor or the like and have these units operated by a program, it is also possible to meet this requirement by reducing the total size of the program and by restricting the power consumption of the memories for storing the program.

Particularly, the present invention becomes effective for a three-dimensional graphic processing which requires a high-speed comparison operation.

BRIEF DESCRIPTION OF THE DRAWINGS

FIG. 5 is a flow chart for showing the contents of the processing of the graphics processing according to the present invention;

FIG. 6 is an explanatory diagram for explaining the result of comparison between the coding result of a depth buffer test according to the conventional method and the coding result of a depth buffer test according to the present invention;

FIG. 7 is an explanatory diagram for explaining the comparison result of coding of an alpha test according to the present invention between the case where the comparison operation is for a partition instruction and the case where the comparison operation is for other than a partition instruction;

DESCRIPTION OF THE PREFERRED EMBODIMENT

An embodiment relating to the present invention will be explained below with reference to the drawings.

It is desirable that the comparison operating unit to be explained in the present specification has a structure that has been built into a microprocessor, for example. In this case, the comparison operating unit operates by a program which is given to the microprocessor.

Figure 1:
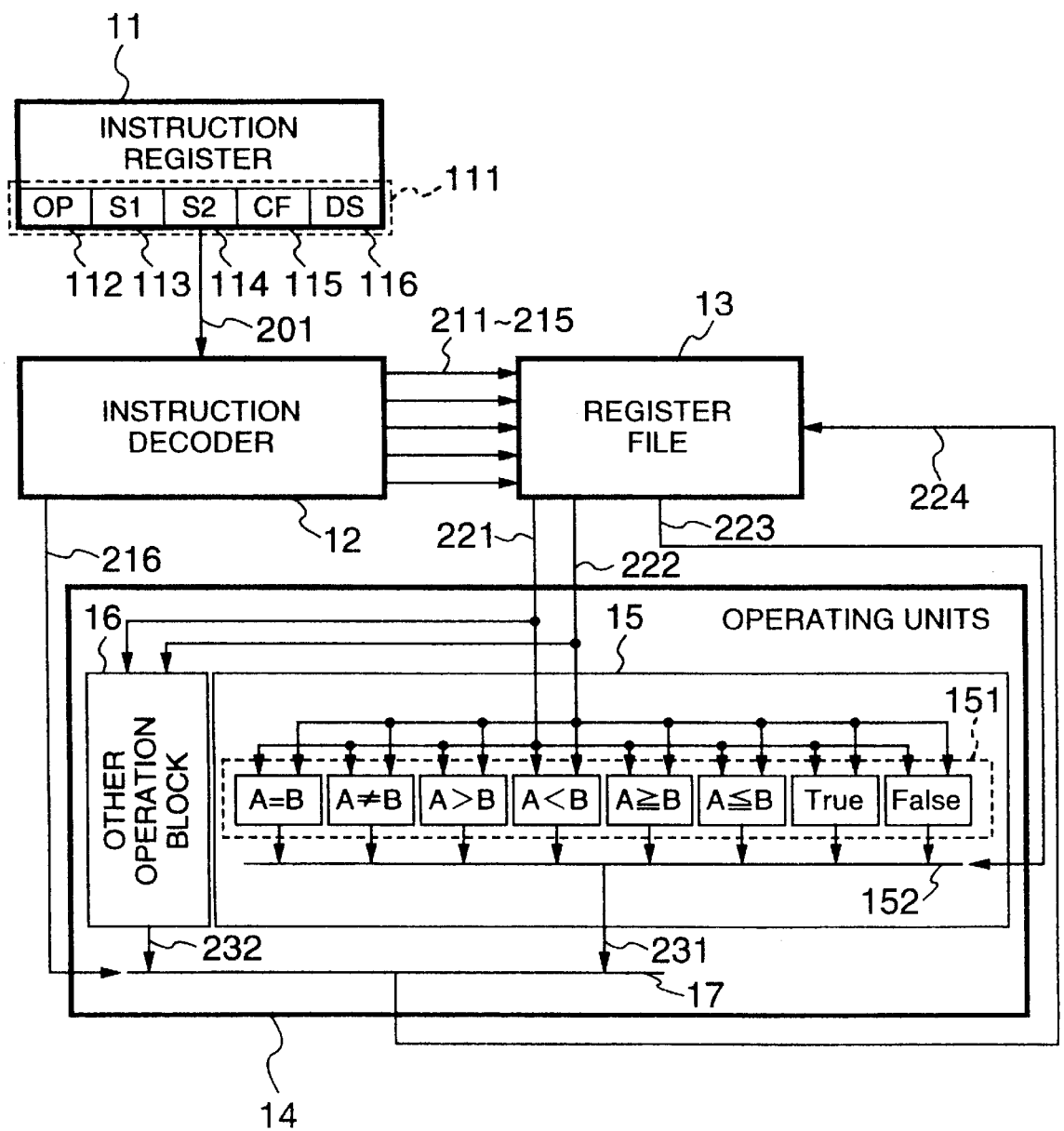
FIG. 1 is a configuration diagram for showing the unit structure relating to an embodiment according to the present invention.

FIG. 1 is a configuration diagram of a comparison operating unit according to one embodiment of the present invention.

The comparison operating unit shown in FIG. 1 is structured by an instruction register 11 for storing an instruction to be executed, an instruction decoder 12 for decoding the instruction, a register file 13 having a register for storing two data that are to be operated, a kind of the operation (to be hereinafter simply referred to as "a comparison condition" for convenience sake in the case of the comparison operation) and a result of the operation, and an operating unit 14 for executing various types of processing.

The operating unit 14 includes a comparison operation block 15 for executing a comparison operation, an other processing block 16 for executing a processing other than the comparison operation, an operation result selector 17 for selecting one necessary operation result from the results of the execution of a plurality of kinds of operations. The comparison operation block 15 includes comparators 151 for executing a plurality of kinds (eight kinds in the case of FIG. 1) of comparison and a comparison result selector 152 for selecting one necessary result from the results of the plurality of kinds of comparison.

Operation information (OP) 112 and operand information are stored in the instruction register 11. The operation information (OP) 112 is information for determining a kind of an instruction.

The operand information has a first object register code (S1) 113, a second object register code (S2) 114, a conditional register code (CF) 115 and a result register code (DS) 116. The first object register code (S1) 113 and the second object register code (S2) 114 store information for showing storage destinations of the two data to be operated respectively. The storage destination of these information is the register file 13. The conditional register code (CF) 115 stores information for showing a storage destination of a kind of an operation, and the result register code (DS) 116 stores information for showing a storage destination of a result of an operation. The storage destination of these information is also the register file 13.

In the example shown in FIG. 1, the comparators 151 are carrying out the eight kinds of comparison operation at the same time. Of these kinds of comparison operation, "True" is a comparison operation which shows a result as "true (for example, 1)" in all cases and "False" is a comparison operation which shows a result as "false (for example, 0)" in all cases. A result of all the rest of the comparison operation becomes either "true" or "false", that is, either "1" or The operation of the operating unit having the above-described unit structure will be explained below.

Each time when the processing of one instruction has been finished, the instruction to be executed next is stored in the instruction register 11. An instruction 111 stored in the instruction register 11 is outputted to the instruction decoder 12 through an instruction output 201 at a stage of the execution of this instruction. The instruction decoder 12 then decodes the contents of this instruction, that is, the contents of the operation information and the operand information.

When the operation information (OP) 112 for structuring the instruction 111 coincides with the code for showing the comparison operation instruction, the instruction decoder 12 determines that the operand information includes the first object register code (S1) 113 and the second object register code (S2) 114 for showing registers that store the values to be compared, the condition register code (CF) 115 for showing a register that stores the comparison conditions and the result register code (DS) 116 for showing a register that stores the result of the comparison. The instruction decoder 12 then decodes the contents of the comparison operation instruction and performs a predetermined processing.

To be more specific, in order to control data transactions between the operating unit 14 and the register file 13, the instruction decoder 12 outputs the storage destination information shown by the first object register code 113 by using a first register signal line 211, outputs the storage destination information shown by the second object register code 114 by using a second register signal line 212, outputs the storage destination information shown by the condition register code 115 by using a third register signal line 213 and outputs the storage destination information shown by the result register code by using a fourth register signal line 214.

The signal line 215 is a control signal line. By using the control signal in this control signal line, the instruction decoder 12 refers to the operation information and carries out a processing for extracting data from positions in the register file 13 corresponding to the individual data storage destinations that have been given by the other signal lines (211, 212, 213, 214), in the case of the comparison operation, for example. The control signal also functions as a control signal for executing the operation other than the comparison operation.

In other words, by the above-described control signal, the register file 13 that has received each register code extracts data from the storage destination registers shown by S1, S2 and CF (hereinafter to be simply referred to as a "storage destination" for convenience sake), and outputs the data through three output ports 221, 222 and 223.

The control signal line 215 also outputs a control signal to the register file 13 so that an input value from an input port 224 is stored in the storage destination register designated as DS. Further, the instruction decoder 12 outputs an execution instruction code 216 to the operating unit 14 so that the operating unit 14 selectively outputs a comparison operation result from a plurality of processing results.

The register file 13 decodes the control signal 215 inputted from the instruction decoder 12, extracts the data stored in the storage destinations shown by the first register signal 211 and the second register signal 212 that have been inputted, and outputs the extracted data to the operating unit 14 through the first output port 221 and the second output port 222.

The third register signal 213 shows a storage destination for storing the comparison conditions. The data for showing the comparison conditions to be stored in this storage destination is outputted to the comparison result selector 152 through the third output port 223 in order to select a comparison operation result corresponding to the above-described comparison conditions out of a plurality of results of the comparison operations that have been carried out by the comparison operation block 15. The fourth register signal 214 shows a storage destination for storing the operation result, and the data to be inputted through the input port 224 is stored in this storage destination.

The operating unit 14 transfers the two data 221 and 222 inputted from the register file 13 as the data to be operated to the comparison operation block 15 and the other processing block 16 for carrying out the processing other than the comparison operation. The comparison operation block 15 makes the plurality of kinds of comparators 151 to operate for the inputted two data 221 and 222, simultaneously execute the plurality of kinds of comparison operation, and output the comparison operation results, that is, either "true" or "false". The output results of the plurality of kinds of comparison operation are inputted to the selector 152. In order to carry out the operation for selecting one comparison operation result out of the plurality of kinds of comparison operation results, the data 223 for showing the comparison conditions assigned by CF is inputted from the register file 13.

As a result, the comparison result selector 152 outputs a comparison operation result 231 corresponding to the comparison condition assigned by CF. The other processing block 16 for executing the processing other than the comparison operation executes a plurality of kinds of processing for the two data 221 and 222, and outputs a result of the processing 232.

The operation results 231 and 232 outputted from the comparison operation block 15 and the other operation block 16 respectively are inputted to the operation result selector 17. The instruction decoder 12 decodes the operation information and outputs the execution instruction code 216, and selects a necessary operation instruction result, that is, either 231 or 232. The operation result 224 obtained is outputted to the register file 13, which then stores the operation result 224 in the storage destination for storing the operation result assigned by DS.

Now, consider the case where the above-described unit is applied to the depth buffer test which is one of the graphics technologies. As described previously, in the above test, the values to be compared remain unchanged and the comparison conditions can be changed optionally. It is now assumed that there are eight kinds of comparison conditions; "=", "≠", ">", "<", "≧", "≦", "True" for showing that the result becomes "true" without exception regardless of the values to be compared, and oppositely, "False" for showing that the result becomes "false" without exception regardless of the values to be compared. It is also assumed that as the code 223 for showing the above-described comparison conditions, the following are set respectively: "#CmpEQUAL", "#CmpNOTEQUAL", "#CmpGREATER", "#CmpLESS", "#CmpGEQUAL", "#CmpLEQUAL", "#CmpALWAYS" and "#CmpNEVER".

The comparator 15 is structured to have a circuit for simultaneously carrying out the comparison operation for the above-described eight kinds of comparison conditions. When the two values to be compared have been inputted, the eight kinds of comparison operation are executed simultaneously. The selector 152 selectively outputs a result of the comparators corresponding to a comparison condition by referring to the above-described comparison condition codes 223.

For the above operation, the program may be programmed such that one of the eight kinds of comparison conditions is selected by merely changing the comparison condition codes stored in the storage destination for showing the comparison conditions.

Figure 2:
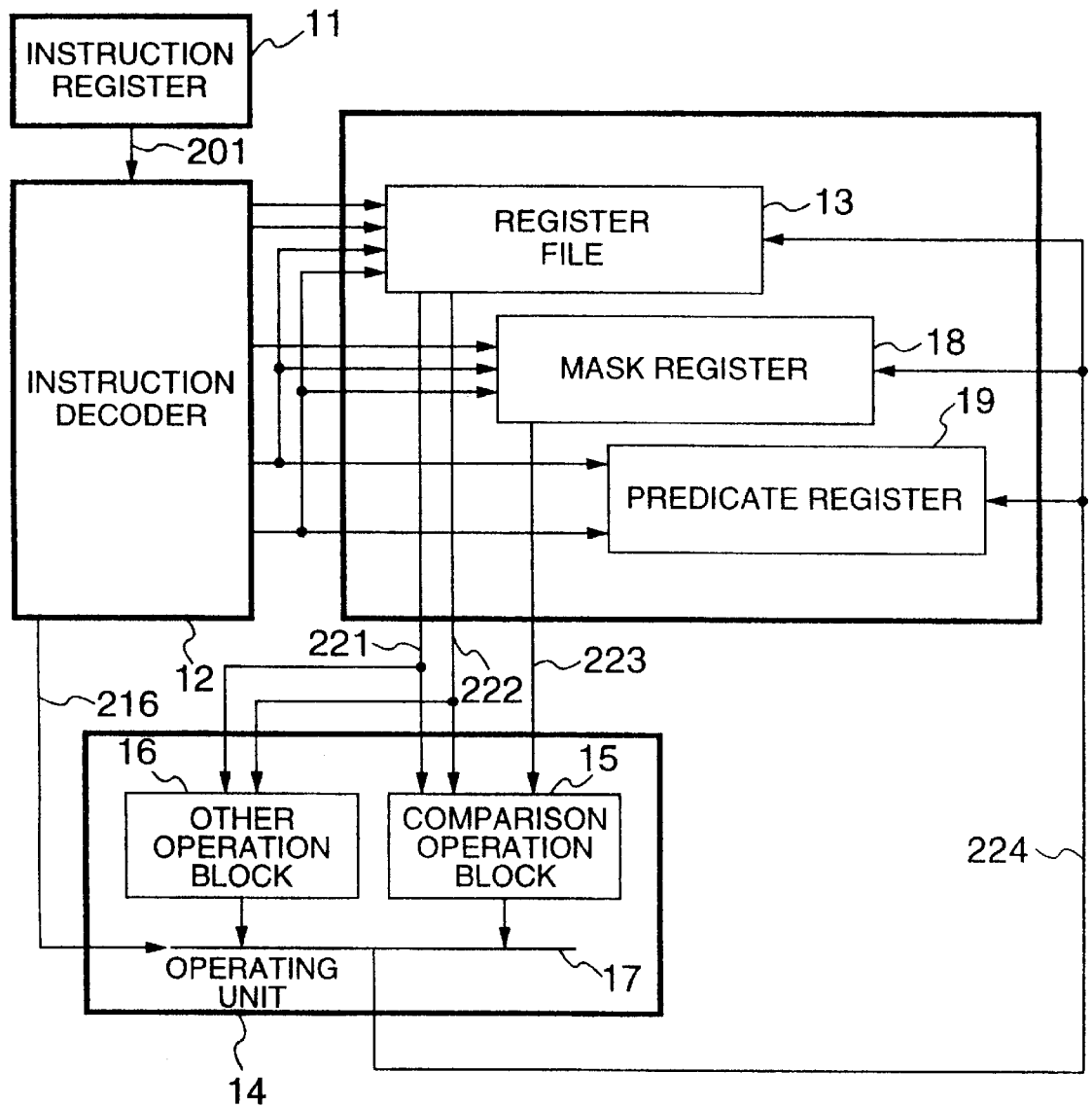
FIG 2 is a configuration diagram for showing the unit structure relating to another embodiment according to the present invention.

FIG. 2 is a configuration diagram for showing another embodiment according to the present invention. The present embodiment is characterized in that this has a structure of having individual exclusive registers as storage destinations for the values to be compared, the comparison conditions and the comparison operation results, respectively.

The present structure has a mask register 18 for storing the comparison conditions and a predicate register 19 for storing the results of the comparison operations, in addition to the instruction register 11, the instruction decoder 12, the register file 13 and the operating unit 14. The register file 13 also functions as a unit for storing the values to be compared.

The operation of the comparison operation unit having the above-described unit structure will be explained below.

When the instruction operation information stored in the instruction register 11 coincides with the code of the comparison operation instruction, the instruction decoder 12 outputs the code for showing the storage destination of the values to be compared stored in the register file 13. Similarly, the instruction decoder 12 outputs the code for showing the storage destination of the comparison conditions stored in the mask register 18.

As a register for storing the comparison results, one register can be selected from out of a predetermined register in the register file 13, the mask register 18 and the predicate register 19. A register code for showing the storage destination is outputted to the selected register.

The operating unit 14 reads the two data to be compared from the register in the register file 13 and reads the comparison conditions from the mask register 18, and executes the comparison operation. Results of the comparison operation are outputted to any one register out of a predetermined register in the register file 13, the mask register 18 and the predicate register 19.

As described above, while it has been necessary in the past to have three input ports in total for the register file 13, that is, two for the values to be compared and one for the comparison conditions, the hardware structure having the exclusive register for storing the comparison conditions requires only two input ports by eliminating the input port for the comparison conditions.

Although one new input port is necessary for the mask register 18, this does not require any incremental hardware. Assuming that there are 64 32-bit registers and 16 8-bit mask registers in the register file 13, for example, the relative hardware scale becomes approximately "9 to 16" between the case where there is an exclusive register and the case where there is no exclusive register. Accordingly, it is more effective to use an exclusive register from the viewpoint of a reduction of the total hardware scale.

Figure 3:
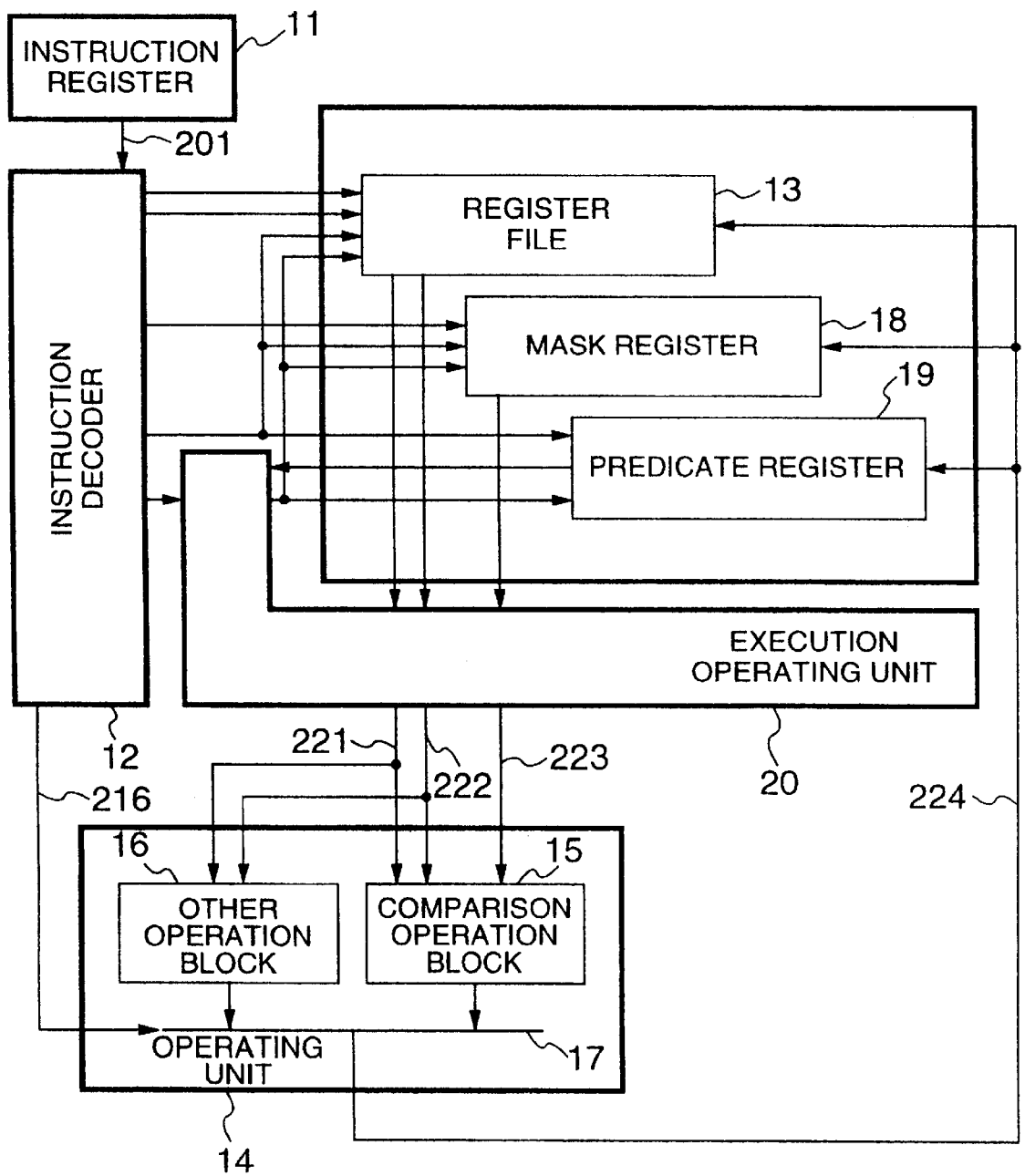
FIG. 3 is a configuration diagram for showing the unit structure relating to still another embodiment according to the present invention.

FIG. 3 is a configuration diagram for showing still another embodiment according to the present invention. The present embodiment is characterized in that this has additionally an execution operating unit 20 for controlling the determination of whether an instruction transferred to the instruction decoder 12 should be executed or not by referring to values stored in a predetermined storage destination of the predicate register 19.

The execution operating unit 20 controls to determine that an instruction assigned by an instruction code is to be executed if a value of the predicate register 19 assigned by the operand information is "1", and the instruction is not to be executed if the value is "0", for example.

When the operation information of an instruction code stored in the instruction register 11 coincides with a code for showing the comparison operation instruction, information for showing the assigned storage destinations is transferred to the register file 13, the mask register 18 and the predicate register 19, in a manner similar to the above-described example. In this case, the execution operating unit 20 reads the value of the predicate register 19 in which the so-called execution information assigned by the operand information is stored. If the value is "1", for example, the execution operating unit 20 transfers the two data which are the values to be compared stored in the register of the register file 13 to the operating unit 14, and transfers the data for showing the comparison conditions stored in the mask register 18 to the comparison operation block 15, in a manner similar to the above example.

The execution operating unit 20 also controls so that the comparison operation result outputted from the operating unit 14 is stored in a register assigned by the operand information. In other words, the comparison operation result outputted from the operating unit 14 is stored in one of the register file 13, the mask register 18 and the predicate register 19. If the value of the execution information is "0", for example, the execution operating unit 20 does not transfer the values to be compared and the comparison conditions to the operating unit 14 and controls the register file 13, the mask register 18 and the predicate register 19 so that the operation results outputted from the operating unit 14 are not written in the registers.

When the operation results are not written in the registers in the manner as described above, the status before the execution of the instruction can be maintained. When the comparison operating unit of the present invention is used with a structure having the execution operating unit 20 which can determine the execution or non-execution of an instruction according to the value of the predicate register 19, it is possible to improve the processing speed as compared with the case where the comparison operation is executed and the operation is executed only when the comparison result has been satisfied (for example, "True").

Accordingly, it is also possible to eliminate the processing for accepting the comparison conditions and the branch processing after the execution of the comparison instruction. This can also prevent a disturbance of the pipeline processing and a generation of idle time, which results in an improvement in the processing efficiency.

An example of the test processing in graphics will be compared between the case where the conventional processing method is used for the processing and the case where the microprocessor structured to include the comparison operating unit shown in FIG. 3 is used for the processing.

Figure 4:
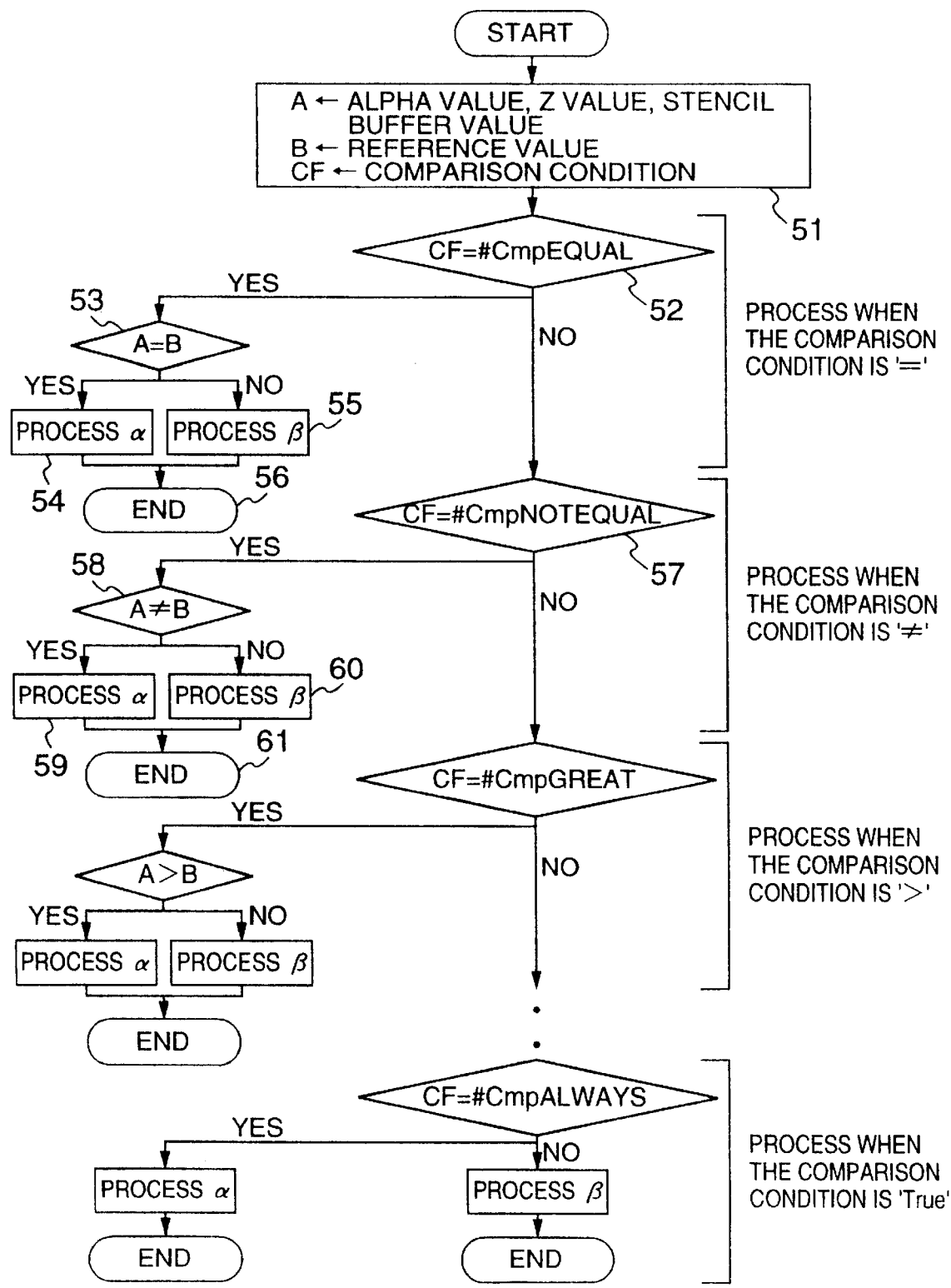
FIG. 4 is a flow chart for showing the contents of the processing of the conventional graphics processing.

An outline of the conventional test processing in graphics is shown in FIG. 4 and an outline of the test processing in graphics by the comparison operating unit according to the present invention is shown in FIG. 5.

At first, the conventional test processing in graphics will be explained with reference to FIG. 4.

In the case of the alpha test, an alpha value and a reference value (a redetermined alpha value) of pixels are compared, in the case of the depth buffer test, a Z value and a reference value (a redetermined Z value) of pixels are compared, and in the case of the stencil test, a value of a stencil buffer and a reference value (a redetermined stencil buffer value) are compared. These values to be compared are stored in two registers (A and B). Comparison condition is set freely by the programmer, and the code of the comparison condition is stored in the register (CF) (Step 51).

In order to determine what comparison condition has been set, it is determined which one of a predetermined plurality of kinds of comparison conditions a comparison condition (CF) coincides with.

At first, it is determined whether the code of the comparison condition (CF) is the same as the code "#CmpEQUAL" which shows "=" (Step 52). If the code of the comparison condition (CF) is the same as the code "#CmpEQUAL", a comparison operation of "A=B" is executed for the value allocated to the pixel and its reference value, by using this comparison condition (Step 53). Depending on the comparison result of satisfied or not satisfied (that is, Yes or No), either a programmer predetermined processing a (Step 54) or a processing β (Step 55) is executed, and then the test processing is finished (Step 56).

If it has been determined at Step 52 that the code of the comparison condition (CF) is not the same as "#CmpEQUAL", it is then determined whether the code of the comparison condition (CF) is the same as the code of other comparison condition "#CmpNOTEQUAL" which shows "≠" (Step 57). If the code of the comparison condition (CF) is the same as the code of the comparison condition "#CmpNOTEQUAL", a comparison operation of "A≠B" is executed (Step 58). Depending on the comparison result of satisfied or not satisfied (Yes or No), either a processing a (Step 59) or a processing β (Step 60) is executed in a similar manner, and then the test processing is finished (Step 61).

A similar processing is repeated thereafter. In the worst case, it is necessary to carry out the processing for determining the coincidence of the comparison condition by the number of "a predetermined number of comparison conditions minus 1".

Next, the comparison operation according to the present invention will be explained with reference to FIG. 5.

Own values for respective tests which are different depending on the test and reference values (predetermined values for the respective tests) are to be compared in a similar manner to the above, and the values to be compared are stored in the registers (A and B). Comparison condition is also stored in the register (CF) in a similar manner as described above (Step 51).

In the comparison operation according to the present invention, once two values to be compared (A and B) and a code (CF) for showing a comparison condition are given, it is possible to execute the comparison operation based on the given comparison conditions, without the need for executing a processing for determining a kind of the comparison condition.

For example, when the code "#CmpEQUAL" which shows "=" has been stored as the comparison condition, upon executing the comparison operation instruction, a comparison operation of "A=B" is executed (Step 62). When the comparison condition has been satisfied (Yes), a processing a (Step 63) is executed, and when the comparison condition has not been satisfied, a processing a (Step 64) is executed, and the processing is finished immediately. Further, when the code of the comparison condition is "#CmpNOTEQUAL" which shows "≠", it is not necessary to carry out a special branch processing, and the comparison operation of "A≠B" is executed (Step 62). Depending on the comparison result of satisfied or not satisfied, either the processing a (Step 63) or the processing β (Step 64) is executed, and then the processing is finished. For other comparison conditions, it is not necessary to carry out the branching for accepting the comparison conditions in exactly the same manner.

FIG. 6 is an explanatory diagram for comparing the result of coding of the program for carrying out the processing shown in FIG. 4 with the result of coding of the program for carrying out the processing shown in FIG. 5, that is, the comparison between the result of the conventional coding of the test processing in graphics and the result of the coding of the test processing in graphics in the case where the comparison operating unit according to the present invention is used. This diagram shows the total number of tests, the number of instructions to be tested and the number of conditional branch instructions to be executed. It is known from this diagram that the quantity of program is reduced according to the present invention. In the diagram, n represents the number of processing instructions after the comparison operation. To be more specific, n represents the number of processing (processing a and A) next to the actual comparison operation to be carried out at Step 53.

Next, a description will be made of a unit which is characterized in that the unit divides a register storing values to be compared into a plurality of fields and executes a comparison operation for each field in parallel. An instruction for executing the parallel processing of values stored in each field will hereinafter to be called a "partition instruction".

Figure 8:
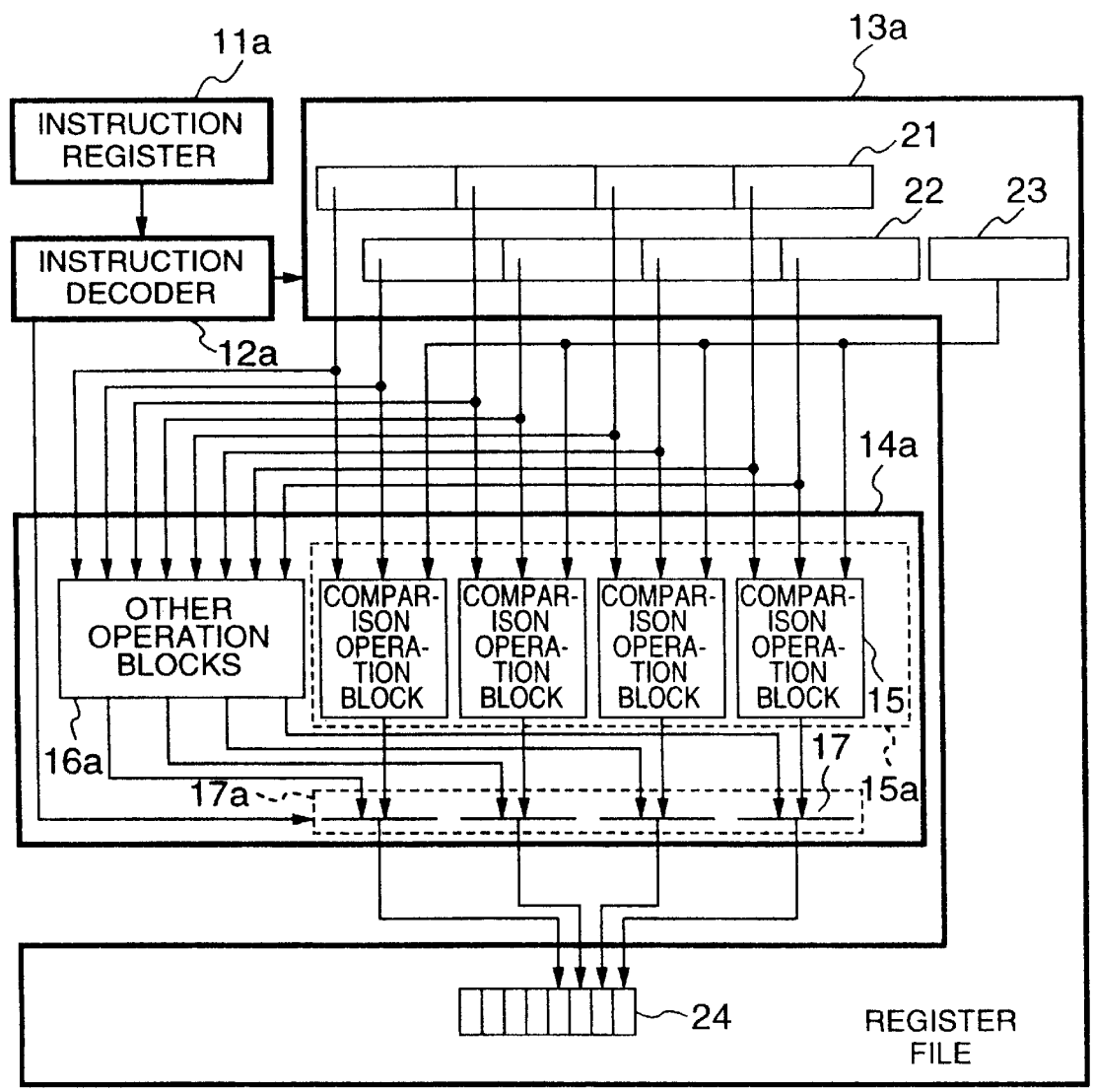
FIG. 8 is a configuration diagram of an embodiment according to the present invention which makes a partition instruction executable.

FIG. 8 is a configuration diagram for showing the unit structure of a unit which makes it possible to handle the unit shown in FIG. 1 according to a partition instruction. As described in the above, it is desirable to structure a microprocessor which includes this type of unit.

The comparison operating unit according to the present embodiment includes an instruction register 11a for storing operation information and operation code information for an instruction to be executed, an instruction decoder 12a for decoding an instruction and outputting various kinds of signal, a register file 13a having a storage destination (register) for storing values to be compared, comparison conditions and results of comparison, and an operating unit 14a for executing various kinds of processing.

The operating unit 14a includes a group of comparison operation blocks 15a having a plurality of comparison operating blocks 15 for executing a comparison operation corresponding to a comparison condition given, a group of other operation blocks for outputting a plurality of operation results by executing the other operation processing, and a group of operation result selectors 17a having a plurality of operation result selectors 17 for selecting one necessary result.

The register file 13a includes a register 21 which can store four kinds of a first value to be compared and a register 22 which can store four kinds of a second value to be compared. A register 23 stores comparison conditions. Data stored in the fields corresponding to the registers 21 and 22 are compared as the values to be compared.

Description will be made by limiting the number of parallel operation to four kinds for the sake of convenience of explanation. However, it is needless to mention that the number of operations to be executed in parallel is not limited to four.

The operation of the comparison operating unit having the above-described structure will be explained below.

It is assumed that the first register 21 and the second register 22 provided within the register file 13a have 32 bits respectively, that the values to be compared are eight-bit data, that the two registers 21 and 22 are divided into four fields having eight bits respectively, and that the values to be compared are stored in each filed of the two registers.

When an instruction stored in the instruction register 11a has been transferred to the instruction decoder 12a and it has been determined by the instruction decoder 12a that this instruction is a comparison operation instruction of a partition instruction, the instruction decoder 12a outputs information of a storage destination of data to be compared, a storage destination of comparison conditions and a storage destination of each operation result, to the register file 13a, and outputs a control signal to the operating units 14a so that the operating units 14a output results of the comparison operation.

Based on the information received from the instruction decoder 12a, the register file 13a outputs the values stored in each field of the registers 21 and 22, designated as the values to be compared and the values stored in the register 23, designated as the comparison conditions, to the operating unit 14a. Within the operating unit 14a, the inputted values are transferred to the comparison operation block group 15a and the other operation block group 16a. The plurality of kinds of values to be compared inputted to the comparison operation block group 15a are outputted to the corresponding comparison operation blocks and the comparison conditions are outputted to the corresponding comparison operation blocks 15 respectively.

Each of the comparison operation blocks 15 refers to the inputted comparison condition, executes a comparison operation and outputs a result of the processing. The comparison operation block group 15a outputs a plurality of operation results of the internal comparison operation blocks. The outputted operation results are outputted through the selector 17a together with a plurality of operation results outputted from the other operation block group. A desired operation result is selectively outputted based on the control signal transferred from the instruction decoder 12a as the control signal of the selector 17a.

A finally outputted operation result in each field is stored in each field of a register 24 in the register file which is the assigned storage destination for storing the operation result.

In a three-dimensional graphics processing, each value of R, G, B and A is handled in 8 bits or 16 bits in many cases. The processing to be executed is almost the same for all the pixels. Accordingly, it is extremely effective to execute the same processing in parallel for improving the efficiency of the processing. When an alpha test is to be executed by using the comparison operating unit according to the present invention which can execute a partition instruction, it becomes possible to simultaneously execute a comparison of a plurality of alpha values with programmer preassigned reference values for a plurality of pixels, by extracting the plurality of alpha values allocated to pixels and storing these alpha values in each field of the register. In other words, it becomes possible to execute a test of a plurality of pixels by one instruction.

Figure 9:
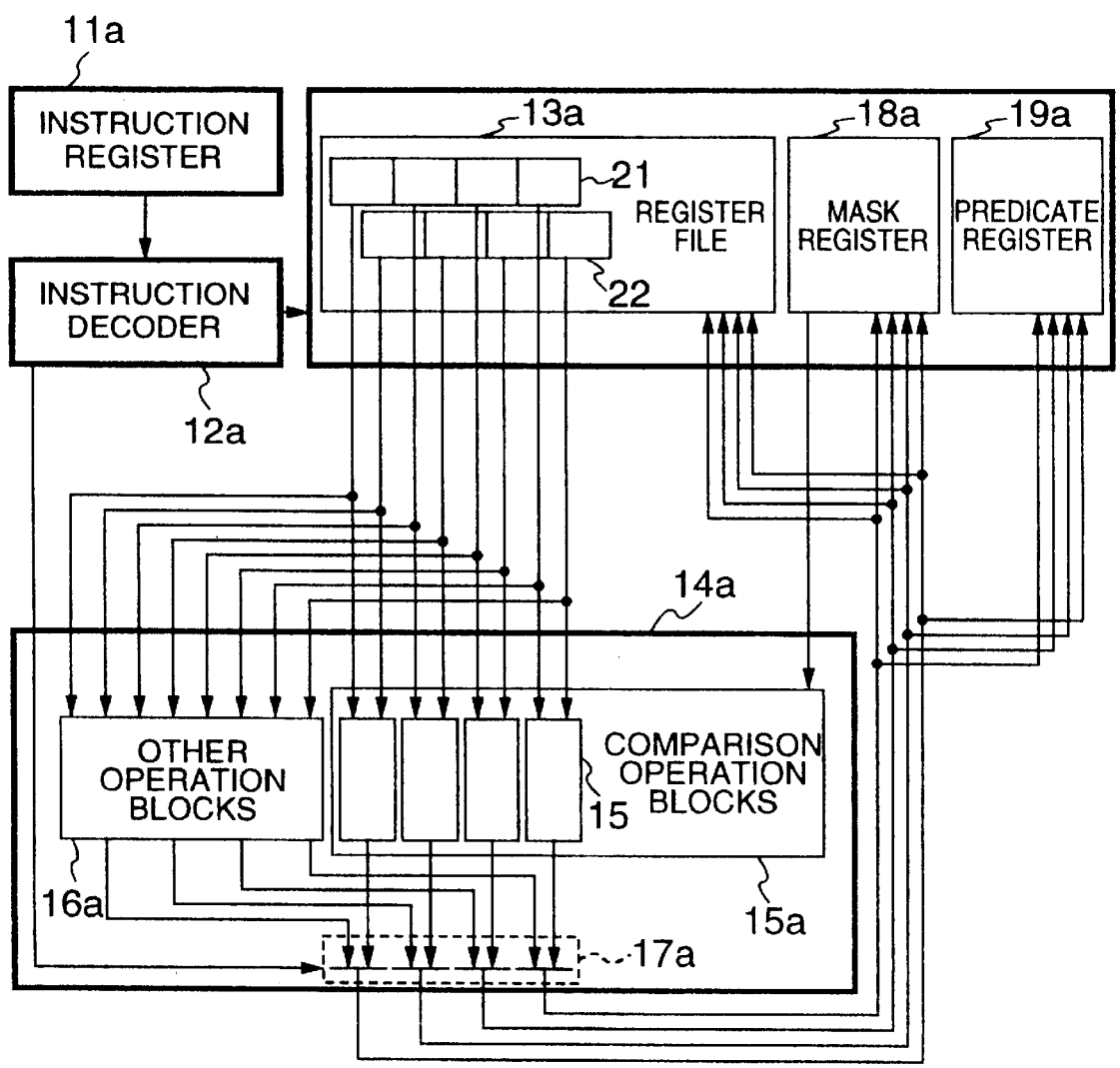
FIG. 9 is a configuration diagram for showing the unit structure relating to another embodiment according to the present invention.

FIG. 9 is a configuration diagram of the comparison operating unit relating to another embodiment of the present invention. This has exclusive registers for storing values to be compared, comparison conditions and results of comparison, and this structure makes it possible to execute a comparison operation of a partition instruction.

The structure of FIG. 9 is different from the structure of FIG. 8 in that the comparison operation unit in FIG. 9 has a mask register 18a for storing comparison conditions and a predicate register 19a for storing comparison results in addition to the instruction register 11a, the instruction decoder 12a, the register file 13a and the operating unit 14a, in a manner similar to the change of the structure from FIG. 1 to FIG. 2.

The register file 13a functions as a storing unit for exclusively storing values for comparison, and the mask register functions as a storing unit for exclusively storing comparison conditions. Although the predicate register 19a functions as a unit for exclusively storing the results of comparison, the comparison operating unit has such a structure that the results of comparison operation can also be stored in predetermined storage destinations of the register file 13a and the mask register 18a.

When a comparison operation instruction of a partition instruction has been executed, the values stored in the register of the register file 13a are transferred to the operating unit 14a as the values to be compared and the values stored in the mask register 18a are transferred to the comparison operation block group 15a as the comparison conditions.

A plurality of comparison operation results outputted from the operating unit 14a are stored in each field of one of the registers of the register of the register file 13a, the mask register 18a and the predicate register 19a.

The structure of having the exclusive registers has an advantage that the scale of the hardware can be made smaller because the number of the output ports of the register file 13a can be reduced.

Figure 10:
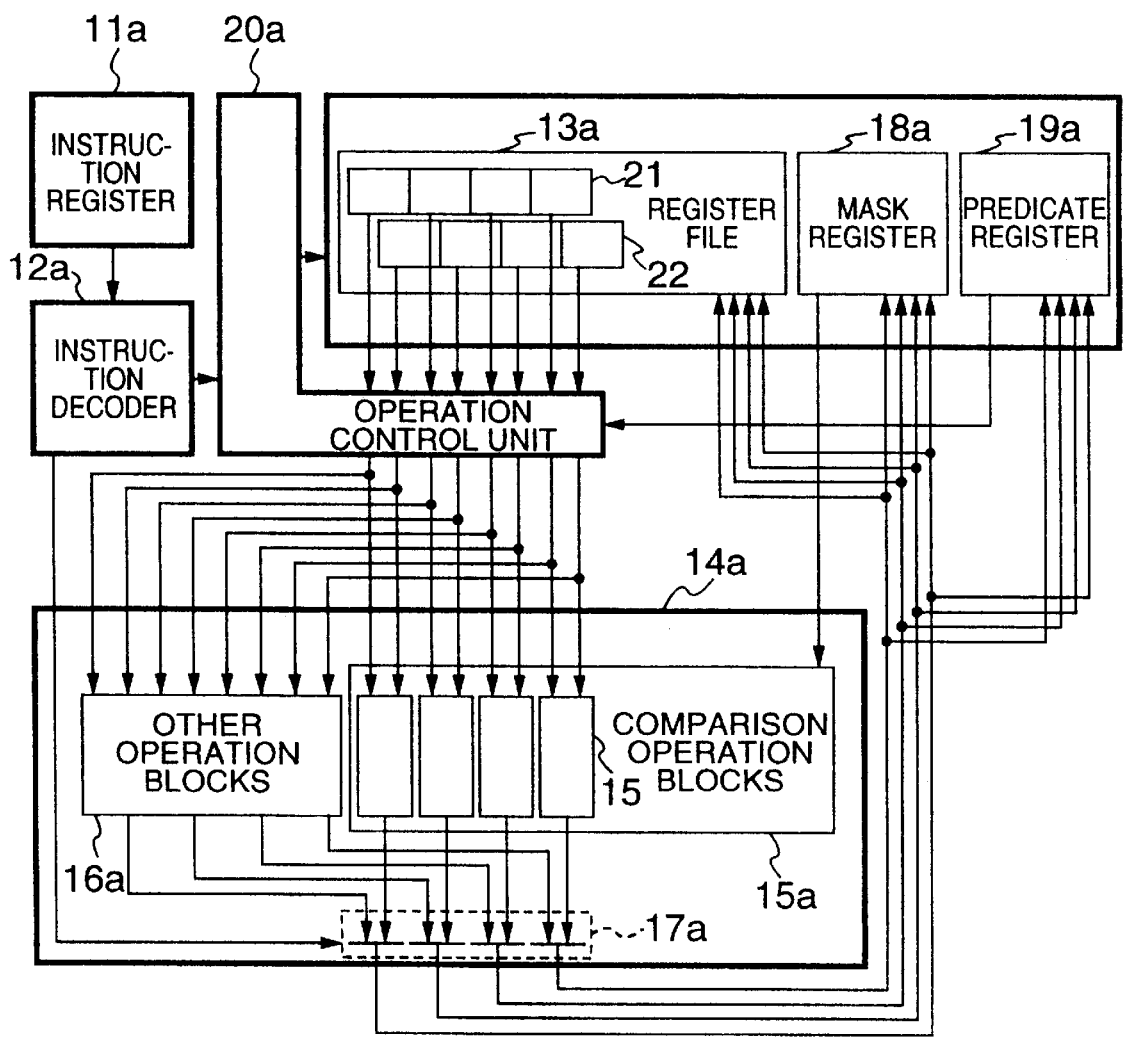
FIG. 10 is a configuration diagram for showing the unit structure relating to still another embodiment according to the present invention.

FIG. 10 is a configuration diagram of the comparison operating unit relating to still another embodiment of the present invention. This shows an example of the unit which additionally has an operation control unit that can set whether an instruction stored in the instruction register should be executed or not depending on the value of the predicate register and which has a structure that can execute a comparison operation instruction of a partition instruction.

The structure of FIG. 10 is different from the structure of FIG. 9 in that the comparison operating unit in FIG. 10 additionally has an operation control unit 20a which so controls the operation that when the value of the predicate register 19a assigned by the operand information is "1", for example, an instruction assigned by the operation information is executed and when this value is "0", the above instruction is not executed, in a similar manner to the change of the structure from FIG. 2 to FIG. 3.

In other words, when an instruction code sent from the instruction register 11a has been stored in the instruction decoder 12a, the operation control unit 20a reads a value of execution information stored in the predicate register 19a assigned by operand information. When this value is "1", the operation control unit 20a outputs the values to be compared stored in the register file 13a to the operating unit 14a. When operation results outputted from the operating unit 14a have been transferred to any one of the register file 13, the mask register 18a and the predicate register 19a, the operation control unit 20a controls to write the results of the inputted operation in an assigned register out of the above-described registers. The operation control unit 20a controls the register file 13a, the mask register 18a and the predicate register 19 so that when the execution information is "0", for example, the values to be compared are not transferred to the operating unit 14a and that the operation results outputted from the operating unit 14a are not stored in each register.

The above-described comparison operating unit makes it possible to improve further the efficiency of a comparison operation by avoiding the need for a branch processing to be carried out based on the results of comparison operation as well as avoiding the need for a branch processing required for determining a comparison condition, as is also the case with the unit shown in FIG. 3.

Figure 11:
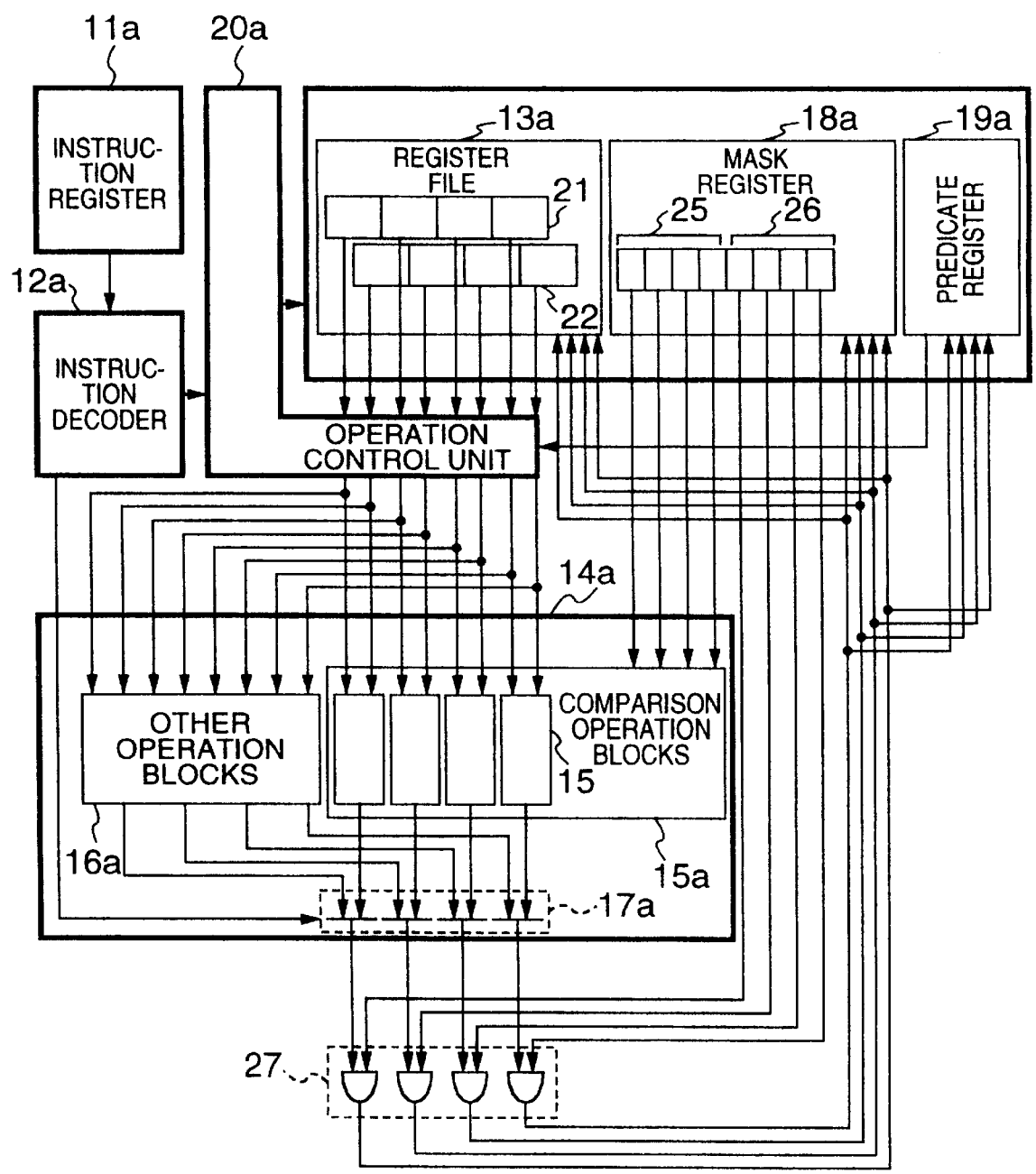
FIG. 11 is a configuration diagram for showing the unit structure relating to an embodiment according to the present invention which uses a mask register.

FIG. 11 is a configuration diagram for showing the unit structure according to still another embodiment of the present invention. This shows an example of the comparison operating unit which has a unit that can set whether a comparison operation in each field is to be made valid or not in a processing that uses a partition instruction. To be more specific, this setting is carried out by providing data to mask bits 26.

The operation of the unit relating to the present embodiment will be explained below.

When the operation information of an instruction stored in the instruction register 11a has coincided with a code of a comparison operation instruction, the instruction decoder 12a outputs a code for showing a storage destination register in the register file 13a that stores values to be compared, to the register file 13a. Similarly, the instruction decoder 12a outputs a code for showing the mask register 18a which is a storage destination of the information on whether the comparison conditions and comparison operation of each field are to be made valid or not, to the mask register 18a.

Further, the instruction decoder 11a outputs a code of a register for showing a storage destination to a register for storing the comparison results. It is assumed that in the mask register 18a, the upper four bits (condition bits) 25 store comparison conditions and the lower four bits (mask bits) 26 store information for setting whether the comparison operation in each field is to be made valid or not.

The values to be compared stored in the registers 21 and 22 of the register file 13a are transferred to the operating unit 14a and the condition bits within the mask register 13a are transferred to the comparison operation block group 15a as information on comparison conditions. Within the operating unit 14a, each comparison operation block executes a comparison operation for the values to be compared inputted to each operation block, and a plurality of comparison operation results are outputted.

Each of a plurality of AND circuits 27 executes an AND operation for each of the mask bits 26 of the mask register 18a and a comparison operation result corresponding to each bit. Based on this AND operation, an operation result is reset to "0" for the field in which the mask bit has been set to "0". Accordingly, when the mask register 18a is assigned as the storage destination of the results of the comparison operation and other partition instructions are sequentially executed by using this mask register 18a after the operation results have been stored, an operation result is stored without being reset in only the field that "satisfies" the comparison operation result and that has been set to make the comparison operation result "valid".

Figure 12:
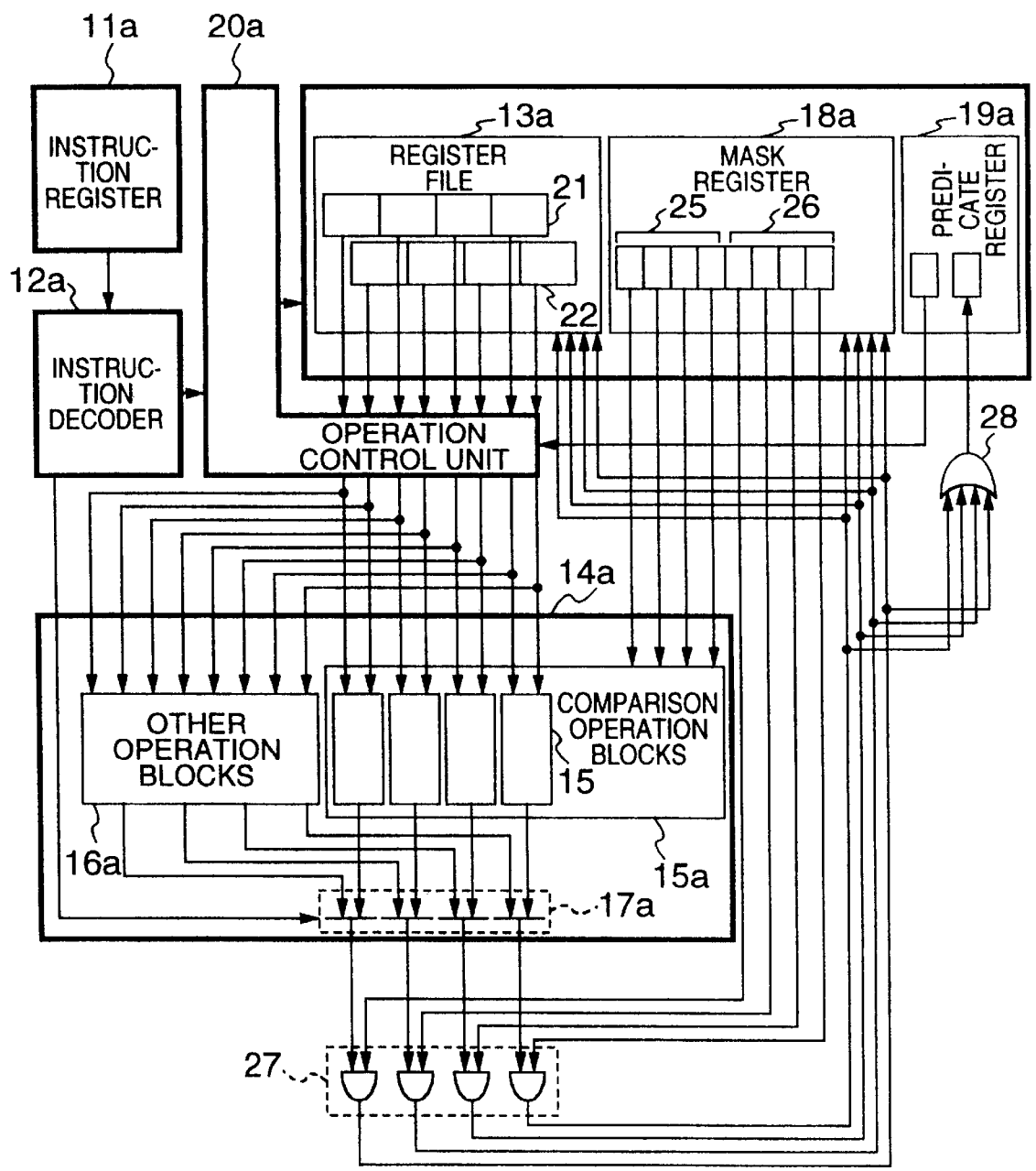
FIG. 12 is a configuration diagram for showing the unit structure relating to an embodiment according to the present invention which uses a mask register.

FIG. 12 is a configuration diagram for showing the unit structure of still another embodiment of the present invention. This unit has a structure for outputting a "satisfied" result as a comparison result when at least one of comparison operations has been satisfied in the field in which the comparison operation is executed.

The operation of the unit relating to the present invention will be explained below.

The operation from when an instruction code has been transferred from the instruction register 11a to the instruction decoder 12a to when the operating unit 14a outputs a plurality of operation results and carries out an AND operation between the operation results and the mask bits 26 is exactly the same as the operation carried out by the unit shown in FIG. 11. Further, an OR circuit 28 is provided for carrying out an OR operation by using all the operation results as an input after the plurality of operation results have been outputted from the AND circuit 27 when the predicate register 19a has been assigned as a storage destination of the operation results.

An output result of the OR circuit 28 is stored in the predicate register assigned as the storage destination of the operation results. In other words, when at least one "1" (satisfied) exists in the operation results of the field that has been set to be executable by the mask bits 26, "1" (satisfied) is stored in the predicate register 19a. For example, when it is assumed that each value of R, G, B and A is stored in each field of the register, an alpha test is carried out for only the A value and the fields in which the values of R, G and B are stored are masked and not executed. When the outputted operation result is stored in the predicate register 19a after executing the comparison operation, the result of the alpha test is stored in the predicate register 19a in the end. When other instructions are executed thereafter by using the predicate register 19a, it is possible to execute the processing only when the alpha test is satisfied.

Next, a comparison will be made between the case where the comparison operating unit of the present invention is driven by using a partition instruction and the case where this unit is driven by not using a partition instruction. As an example, consider the case where a comparison operation is executed for 32-bit registers in which four 8-bit values are stored.

Figure 13:
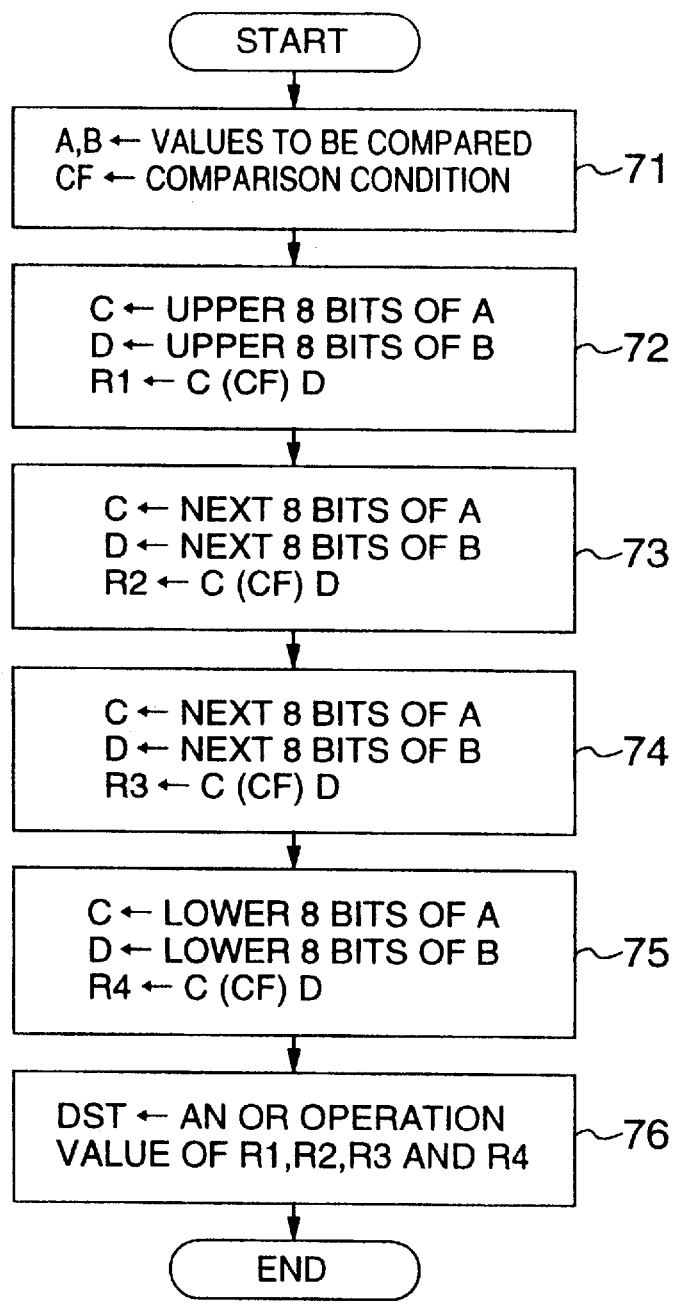
FIG. 13 is an explanatory diagram for showing the flow of the processing when a certain processing has been executed by using a comparison operation instruction which is not a partition instruction.
Figure 14:
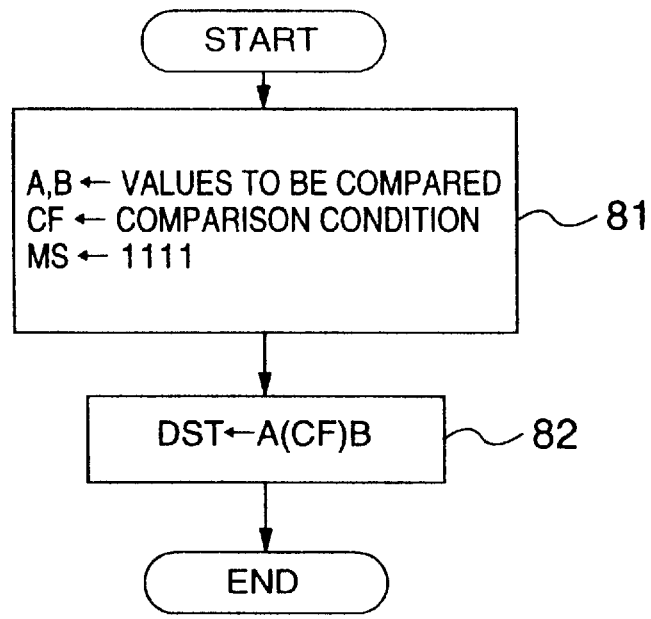
FIG. 14 is an explanatory diagram for showing the flow of the processing when a certain processing has been executed by using a comparison operation instruction which is a partition instruction.

When a comparison operation instruction which is not a partition instruction is used, the processing flow becomes as shown in FIG. 13, and when a partition instruction is used, the processing flow becomes as shown in FIG. 14.

At first, the processing flow of the case where the comparison operation instruction is not a partition instruction will be explained with reference to FIG. 13.

First, two values to be compared are stored in registers (A and B) and a code of a comparison condition that can be set freely is stored in a register CF by the programmer (Step 71).

Next, the upper eight bits of the registers A and B are extracted respectively in order to execute a comparison operation of the values in the first field (MSD eight bits) of the two registers. The comparison operation is executed for the extracted values by referring to the comparison condition set in the register CF. When the comparison condition has been satisfied, "1" is stored in a register R1 and when the comparison condition has not been satisfied, "0" is stored in the register R1 (Step 72). Next, the next eight bits of the registers A and B are extracted in order to execute a similar comparison operation of the values in the second field of these registers. The comparison operation is executed for the extracted values (Step 73). An exactly similar processing is carried out for the third and fourth fields (LSB eight bits), and comparison operation results are obtained (Steps 74 and 75).

Finally, an OR operation is carried out for the four operation results that have been outputted by the four comparison operations, and the operation result is stored in the predicate register (Step 76). In other words, when at least one of the comparison operation results has been satisfied, the value of "1" is stored in the predicate register, and "0" is stored in other cases.

The processing flow in the case where the comparison operation instruction is a partition instruction will be explained with reference to FIG. 14.

First, values to be compared are stored in registers (A and B) and a code of a comparison condition is stored in the condition bits, in a manner similar to the above case. In order to execute a comparison operation of all the four fields, the mask bits (four bits) are all set to "1" (Step 81). When a comparison operation instruction applied with a partition instruction has been executed, a comparison operation corresponding to the comparison condition is carried out for the four fields at the same time (Step 82). As compared with the case where the comparison operation instruction is not a partition instruction, there is an effect that the number of instructions can be smaller when a program is actually coded because it is not necessary to execute the comparison operation by extracting the values to be compared for each field. Further, when the mask bits are used, it is possible to set easily such that a comparison operation for an optional field is not carried out by merely setting the values of the mask bits to "0".

Next, consider a case where a comparison operation which uses the above-described partition instruction has been applied to an alpha test that is one of the graphics technologies. The programmer sets a reference value and a comparison condition for this test and makes the test valid. In the above test, an alpha value of a pixel and a reference value are compared, and based on a result of this comparison, it is determined whether a pixel color is written in a frame buffer of the pixel or not. In other words, this test is for checking whether the result of comparison between the reference value and the alpha value of the pixel has been satisfied or not. If the comparison result has not been satisfied, a pixel color is not written in the frame buffer in the graphics processing.

Figure 15:
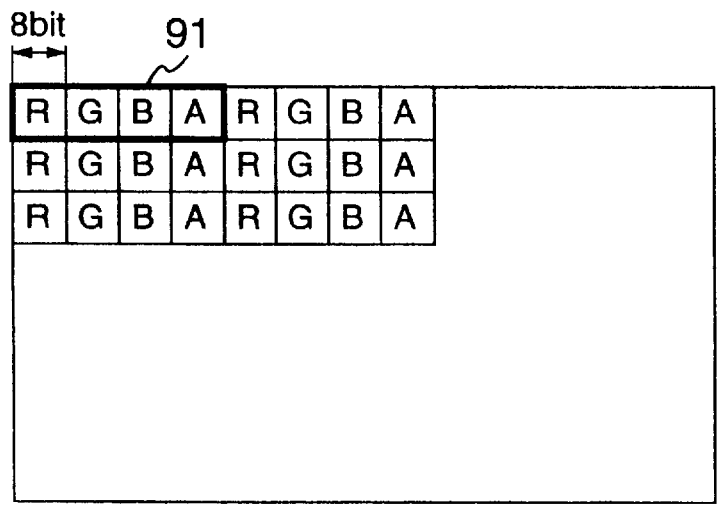
FIG. 15 is an explanatory diagram for explaining the method for storing the four elements of R, G, B and A in the frame puffer.

As shown in FIG. 15, four elements (91) of red (R), green (G), blue (B) and alpha (A) which are pixel colors of pixels are generally stored in a frame buffer in an eight-bit width for each element. Since 32-bit data is necessary for one pixel as a pixel color, in the case of a microprocessor having a 32-bit register, the processing efficiency of a test processing is improved when the 32-bit register is divided into four fields, each having eight bits, and a partition instruction is executed by storing the values (91) of R, G, B and A in each field. A similar test can also be applied to a Z value or like, and it becomes easy to determine a result of a test when the test result is displayed in a display unit.

Figure 16:
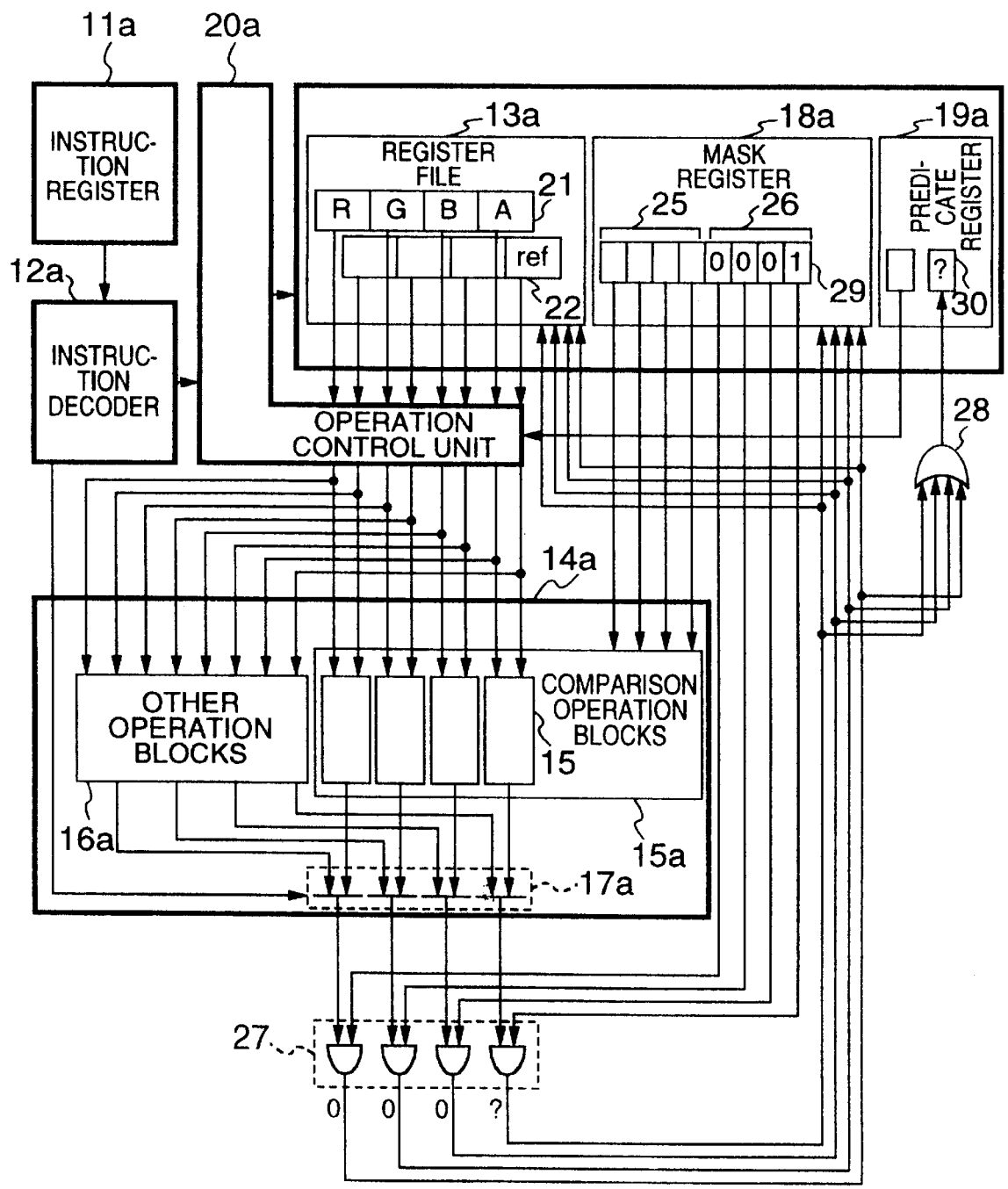
FIG. 16 is an explanatory diagram for explaining the case for executing an alpha test by using a comparison operation of a partition instruction.

FIG. 16 is an explanatory diagram of an embodiment for executing an alpha test by carrying out a comparison operation using a partition instruction when R, G, B and A values have been stored in a 32-bit register in eight-bit unit.

First, pixel colors are stored in a first register 21 and a reference value of an alpha test is stored in a second register 22. Further, a mask register 29 is prepared which includes condition bits 25 having codes of comparison conditions and mask bits 26 having information for making an operation result of each field either valid or invalid.

In the first register 21, a value of R is stored in the first field, a value of G is stored in the second field, a value of B is stored in the third field and a value of A is stored in the fourth field, as pixel colors respectively. A reference value of the alpha test is stored in the fourth field of the second register 22. Data for showing comparison conditions are stored in the condition bits 25 within the mask register 29, and "0, 0, 0, 1" are stored in the mask bits 26 in high order in order to set the value to be compared to only the alpha value in the fourth field. When the comparison operation instruction is executed, results of the AND operation in the first, second and third fields become "0" without an exception. A result of the AND operation in the fourth field is outputted as it is from the OR circuit 28, and this output is stored in the predicate register 30.

Accordingly, when the value stored in the predicate register 30 is "1", this means that the alpha test to this pixel has been "satisfied", and when the value stored in the predicate register 30 is "0", this means that the alpha test to this pixel has "not been satisfied". If an instruction for storing the contents of the register in the memory when the value of the predicate register 30 is "1" has been prepared, it is possible to write a pixel color of the pixel which has satisfied the alpha test in a frame buffer in one instruction, without requiring a branch instruction.

FIG. 7 is a diagram for explaining the comparison between a coding result obtained when an alpha test has been executed by using a comparison operation instruction which is not a partition instruction and a coding result obtained by executing an alpha test by using a partition instruction as shown in FIG. 12. It can be known from this diagram that when the partition instruction is used, the number of the execution instructions is reduced. In the diagram, n represents the number of pixels to be tested by the alpha test.

Figure 17:
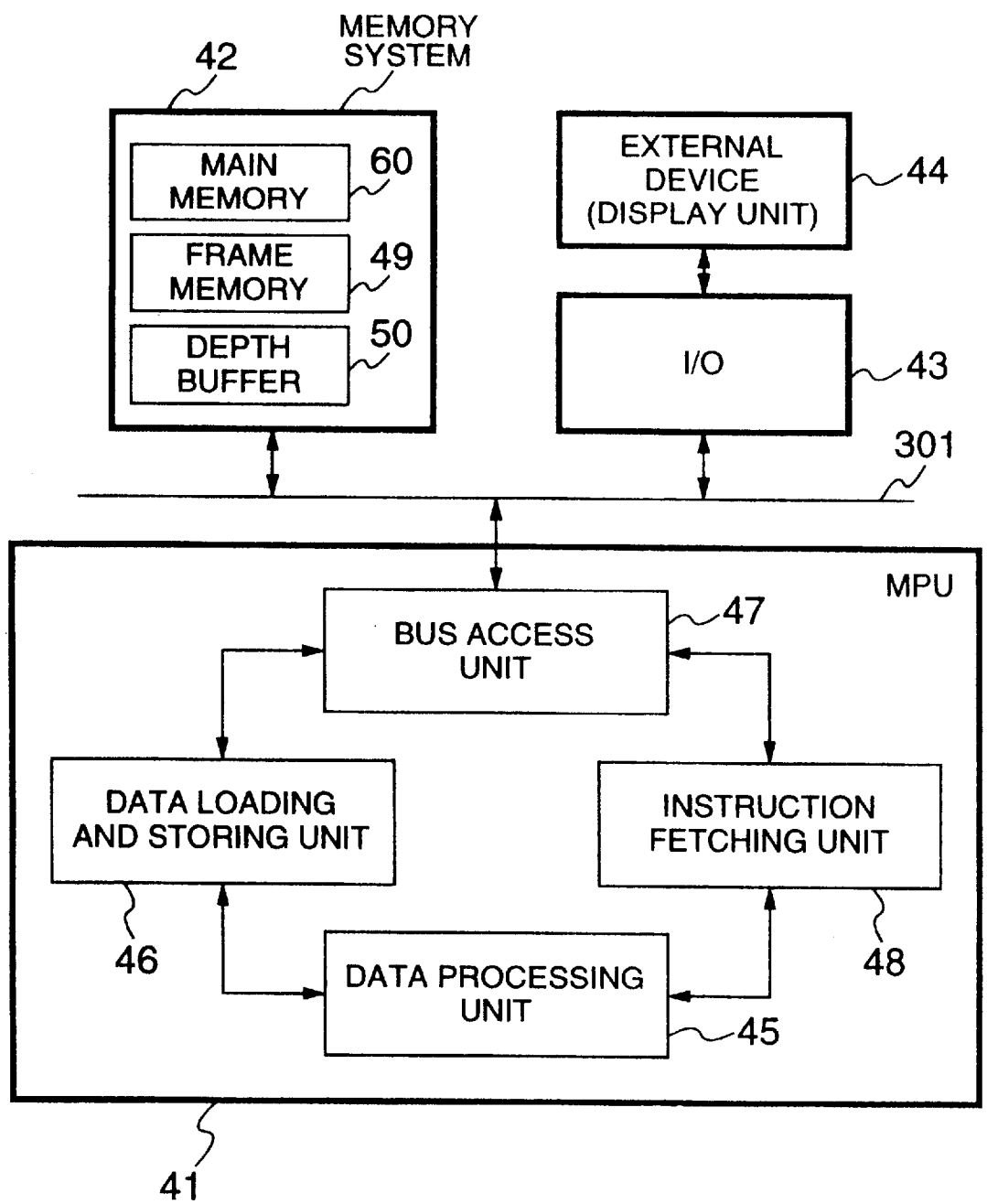
FIG. 17 is a configuration diagram of the system into which a microprocessor incorporating the comparison operating unit relating to the present invention has been built.

FIG. 17 is an example configuration diagram of the system for carrying out a test of graphics processing by using a microprocessor (MPU) structured to have the above-described unit.

The above-described unit is incorporated in a data processing unit 45.

In the system which can execute the above-described comparison operation, the MPU 41 is structured to include a memory system 42 that has a main memory 60 for storing various kinds of processing programs and data, a frame memory 49 and a depth buffer 50 and that can control these memories, an external device 44 such as a display unit or the like, an I/O unit 43 for carrying out input and output controls, and a system bus 301 for transferring such information as addresses, data, control signals, etc.

The microprocessor 41 includes, in addition to the data processing unit 45, a data loading and storing unit 46 for executing a data loading and a data storing in communication with the memory system, a bus accessing unit 47 for carrying out an arbitration between the microprocessor 41 and the external system bus 301, and an instruction fetching unit 48 for fetching instructions from the memory system and transferring the instructions to the data processing unit 45.

As an example, the case of executing a depth buffer processing, which is a three-dimensional processing, in the present system will be considered.

In a three-dimensional graphics processing, one pixel has A (an alpha value) which is a value for showing a transparency, in addition to R (red), G (green) and B (blue) as pixel colors. One pixel also has a Z value (a depth value) for showing a distance from a view point, and is used by the so-called hidden-surface removal processing or the like.

The memory system 42 has the frame buffer 49 for storing the pixel colors (R, G, B and A) and the depth buffer 50 for storing the Z value.

An instruction to be executed is stored in the main memory 60, and is inputted from the memory system 42 to the data processing unit 45 through the buffer accessing unit 47 and the instruction fetching unit 48. When the instruction has been determined as the comparison operation instruction by the data processing unit 45, the Z value of the depth buffer 50 which is one of the values to be compared is loaded to the data processing unit 45 through the bus accessing unit 47 and the data loading and storing unit 46.

The data processing unit 45 executes the comparison operation of the loaded Z value and a predetermined reference value. When the comparison result has been satisfied, a new Z value is written in the depth buffer 50 sequentially through the data loading and storing unit 46 and the buffer accessing unit 47.

When the above processing has been executed for all the pixels to be drawn and the rendering processing has been finished, the rendering processing result and the test results are outputted to the display unit 44 through the I/O unit 43. It is needless to mention that the alpha test using the above-described R, G, B and A values can also be executed in a similar manner.

It is also good to structure such that the pixel colors stored in the frame buffer 49 are outputted to the display unit 44 so that final video information is displayed on the display unit 44.

What is claimed is:

1. A comparison operating unit, comprising:

first storage means for storing at least information on storage destinations of two data to be compared, a kind of comparison operation and a result of the comparison operation, respectively;

second storage means for storing at least the two data to be compared, the kind of comparison operation and the result of the comparison operation, said second storage means including a first exclusive register for storing the at least two data to be compared, a second exclusive register for storing at least the kind of comparison operation and a third exclusive register for storing the results of the comparison operation;

operating means for carrying out a predetermined plurality of kinds of comparison operations for two given data;

selecting means for selecting any one of results of the comparison operations carried out by said operating means; and processing means for carrying out a processing for carrying out the comparison operation, wherein said processing means refers to storage contents of said first storage means, checks storage destinations of the two data to be compared, gives the two data obtained from said first exclusive register to said operating means, and further checks a storage destination for storing kinds of the comparison operation, controls said selecting means to select an operation result corresponding to a kind of comparison operation obtained from said second exclusive register, and carries out a processing of storing an operation result selected by said selecting means into one of:

said third exclusive register corresponding to the storage destination of the comparison operation result stored in said first storage means, a predetermined storage destination in said first exclusive register and a predetermined storage destination in said second exclusive register.

2. The comparison operating unit according to claim 1, wherein said comparison operating unit further comprises execution control means for controlling said operating means, and said execution control means drives said operating means by referring to data stored in a predetermined storage destination in said third exclusive register.

3. A comparison operating unit, comprising:

first storage means for storing at least information on storage destinations storage of data sets when there are a predetermined number of said data sets, each data set including two data to be compared, a kind of comparison operation and a result oft comparison operation;

second storage means for storing at least the two data to be compared, the kind of comparison operation and the result of comparison operation in said each data set, said second storage means including a first exclusive register for storing the at least two data to be compared for each set, a second exclusive register for storing at least the kind of comparison operation and a third exclusive register for storing the result of the comparison operation for each set;

operating means having said predetermined number of operating units, each operating unit carrying out a predetermined plurality of kinds of comparison operations for two given data, selecting means for selecting for each operating unit a result of a comparison operation carried out by each operating unit; and processing means for carrying out a processing of performing said comparison operations, wherein said processing means refers to contents of said first storage means, checks a storage destination of the two data to be compared for each set and gives the two data obtained from said first exclusive register in said second storage means to a corresponding one of said operating units, and further checks a storage destination of a kind of comparison operation, and controls said selecting means so that a result of an operation corresponding to the kind of comparison operation obtained from a corresponding storage destination in said second exclusive register is selected for each corresponding operating unit, and stores an operation result selected by said selecting means for each operating unit, into one of:

said third exclusive register corresponding to a storage destination of a comparison operation result for each set stored in said first storage means, a predetermined storage destination of said first exclusive register, and a predetermined destination of said second exclusive register.

4. The comparison operating unit according to claim 3, wherein said comparison operating unit further comprises execution control means for controlling said operating means, and said execution control means drives said operating means by referring to data stored in a predetermined storage destination in said third exclusive register.

5. The comparison operating unit according to claim 4, further comprising for each operating unit, a storage unit for storing mask information for determining whether an operation result of each operating unit is valid or invalid, and operating means having logical operating units, the number of which is equal to the number of said each operating unit, for carrying out a predetermined logical operation by referring to an operation result of each operating unit and corresponding mask information, wherein said processing means stores a result of a logical operation of a logical operating unit corresponding to each operating means, into one of:

said third exclusive register corresponding to a storage destination of a comparison operation result for each set stored in said first storage means, a predetermined storage destination in said first exclusive register, and a predetermined destination in said second exclusive register.

6. The comparison operating unit according to claim 5, wherein said storage units are provided in said second exclusive register, and said predetermined logical operation to be carried out by said each logical operating unit is an AND operation.

7. The comparison operating unit according to claim 6, further comprising second logical operating means having a function of carrying out an OR operation by inputting results of logical operations of respective logical operating units, wherein said processing means stores a result of an OR operation carried out by said second logical operating means, into a predetermined storage destination in said third exclusive register.

8. A graphic operating system, comprising a comparison operating unit; a microprocessor for carrying out a test processing for graphics; a storage unit for storing at least graphics data to be tested, and a display unit for displaying a processing result, wherein said comparison operating unit includes;

first storage means for storing at least information on each destination of two data to be compared, a kind of comparison operation and a result of the comparison operation;

second storage means for storing at least two data to be compared, the kind of comparison operation and the result of the comparison operation said second storage means including a first exclusive register for storing the at least two data to be compared a second exclusive register for storing at least the kind of comparison operation and a third exclusive register for storing the results of the comparison operation;

operating means for carrying out a predetermined plurality of kinds of comparison operations for two given data; selecting means for selecting a result of the comparison operation carried out by said operating means; and processing means for carrying out the comparison operation, wherein said processing means refers to contents of storage of said first storage means, checks a storage destination of two data to be compared, gives two data obtained from said first exclusive register to said operating means, checks a storage destination for storing kinds of comparison operation, and controls said selecting means to select an operation result corresponding to a kind of comparison operation obtained from said second exclusive register, and stores an operation result selected by said selecting means, into said second storage means corresponding to a storage destination of a comparison result stored in said first storage means, and said microprocessor sequentially obtains said graphic data by a predetermined volume from said storage unit, inputs the obtained data together with predetermined reference data into said operating means as two data to be compared, and processes to display in said display unit a comparison operation result selected by said selecting means according to a predetermined kind of comparison operation.

9. The graphic operating system according to claim 8, wherein said graphic data is one of a RGBA value and a Z value.

* * * * *